(12) United States Patent  
Hicks (10) Patent No.: US 6,429,894 B1  
(45) Date of Patent: Aug. 6, 2002

(54) CRT PHOSPHOR AGING METHOD

(75) Inventor: James E. Hicks, Laguna Beach, CA (US)

(73) Assignee: Mitsubishi Digital Electronics, Cypress, CA (US)

( * ) Notice: Subject to any disclaimer, the term of this patent is extended or adjusted under 35 U.S.C. 154(b) by 0 days.

(21) Appl. No.: 09/450,820

(22) Filed: Nov. 29, 1999

(51) Int. Cl.$^7$ .................................................. H04N 3/20
(52) U.S. Cl. ......................... 348/173; 348/556; 348/558
(58) Field of Search ................................. 348/445, 558, 348/556, 173, 553

(56) References Cited

U.S. PATENT DOCUMENTS

| | | | |
|---|---|---|---|
| 4,670,784 A | * 6/1987 | Goldberg | 358/141 |
| 4,951,149 A | 8/1990 | Faroudja | 358/230 |
| 4,959,717 A | 9/1990 | Faroudja | 358/147 |
| 4,963,979 A | 10/1990 | Sendelweck | 358/37 |
| 5,005,160 A | 4/1991 | Kanda | 358/160 |
| 5,193,006 A | 3/1993 | Yamazaki | 358/242 |
| 5,223,936 A | * 6/1993 | Van der Voort et al. | 358/242 |
| 5,291,295 A | * 3/1994 | Srivastava | 348/805 |
| 5,343,238 A | 8/1994 | Takata et al. | 348/556 |
| 5,442,403 A | 8/1995 | Yasumoto et al. | 348/432 |
| 5,479,186 A | 12/1995 | McManus et al. | 345/11 |
| 5,557,344 A | 9/1996 | Chen | 348/809 |
| 5,592,238 A | 1/1997 | Ogino et al. | 348/744 |
| 5,596,248 A | 1/1997 | Hosoi et al. | 315/368 |
| 5,894,203 A | 4/1999 | Lee | 315/387 |
| 5,912,663 A | 6/1999 | Cheng | 345/184 |
| 5,920,361 A | 7/1999 | Gibeau et al. | 348/750 |
| 6,262,772 B1 | * 7/2001 | Shen et al. | 348/445 |

* cited by examiner

Primary Examiner—Victor R. Kostak  
(74) Attorney, Agent, or Firm—Lyon & Lyon LLP (57) ABSTRACT

Methods and apparatus are provided for equally aging a cathode ray tube (CRT). In the preferred embodiment, a standard CRT having a 4:3 aspect ratio is provided. An external video terminal is coupled to the CRT and receives any number of external video signals, one or more of which may be non-standard external video signals having a 16:9 aspect ratio. In response to a non-standard external video signal, the CRT is illuminated with a mismatched illumination ratio, i.e., a primary CRT region is illuminated and a secondary CRT region is not illuminated, resulting in an unequally aged CRT. A video pattern generator is coupled to the CRT and generates an internal video signal, such that the secondary CRT region is illuminated in response to the internal video signal. Control circuitry is provided for monitoring one or more CRT aging indicators, such as an amount of time and/or CRT luminous intensity, during receipt of the non-standard external video signal, and/or the luminous intensities at the primary CRT region and secondary CRT region, during the generation of a uniform internal video signal. The control circuitry also calculates a desired CRT age equalizing time based on the CRT aging indicators. The desired CRT age equalizing time represents the period of time the secondary CRT region should be illuminated to equalize the unequal CRT aging. The control circuitry is coupled to the video pattern generator to direct the video pattern generator to generate the internal video signal for a period of time equal to the desired CRT age equalizing time.

48 Claims, 5 Drawing Sheets

CRT PHOSPHOR AGING METHOD

FIELD OF THE INVENTION

This invention relates to methods and apparatus for use in conjunction with display devices. Most particularly, these inventions relate to methods and apparatus for uniformly aging one or more cathode ray tubes (CRT's) within a display device, such as a television.

RELATED APPLICATION INFORMATION

This application is related to Application Ser. No. 09/450,942, which is expressly incorporated herein by reference and filed on the same date.

BACKGROUND OF THE INVENTION

All televisions utilize one or more cathode ray tubes (CRT's) to transform video information into light rays for display on the television screen. This is typically accomplished by exciting the phosphor material on the CRT with a scanned beam of electrons, causing the phosphor material to output light. Typically, over time, usage of the CRT causes aging or reduction of light output from the CRT phosphor material. When the entire nominal scan area of the CRT phosphor is excited (i.e., the area of the CRT phosphor corresponding to the geometry of the television screen), the CRT phosphor material is uniformly aged, resulting in an unnoticeable uniform reduction of light from the CRT. Under these circumstances, this phenomenon is typically not problematic. When only a portion of the nominal scan area of the CRT phosphor is excited over a period of time, however, the CRT phosphor is non-uniformly aged, resulting in a noticeable non-uniform reduction of light from the CRT.

This problem typically arises when video signals formatted with one aspect ratio are displayed on a television formatted in another different aspect ratio. The aspect ratio of a television picture image is a ratio of horizontal length to vertical length, expressed in relative units. Standard video signals, such as NTSC and PAL video signals, are formatted with a 4:3 aspect ratio (i.e., 1.33 aspect ratio), whereas non-standard video signals, such as HDTV video signals, are formatted with an aspect ratio greater than the standard 4:3 aspect ratio. For example, an HDTV video signal is typically formatted with a 16:9 aspect ratio (i.e., 1.77 aspect ratio). Modern cinematographic theater movies, not made expressly for conventional television, are typically films with aspect ratios greater than 1.33, typically ranging between 1.65 and 2.35.

When standard video signals are displayed on a standard television screen (i.e., a television screen having a 1.33 aspect ratio), the picture image appears on the entire television screen. As long as these standard video signals are displayed on a standard television screen, the associated CRT or CRT's are uniformly illuminated, and thus uniformly aged. When a non-standard video signal, such as an HDTV video signal, is displayed on a standard television screen, the picture image appears on the middle horizontal region of the television screen and black bars appear on the respective top and bottom horizontal regions of the television screen. As a result, a region of the CRT that would normally be illuminated in response to a standard video signal is not illuminated in response to the non-standard video signal.

Thus, without correction, display of a non-standard video signal on a standard television screen over an extended period of time causes the phosphor material disposed on a primary region of the CRT (represented by a middle horizontal region of the nominal CRT scan area) to age more than the phosphor material disposed on a secondary region of the CRT (represented by respective top and bottom horizontal regions of the nominal CRT scan area). When a standard video signal is then displayed on a standard television screen on which non-standard video signals have been displayed over an extended period of time, the top and bottom horizontal regions of the television screen will be distinctly brighter than the middle horizontal region of the television screen. These distinctions will appear as two respective spatial transition lines between the top and middle horizontal regions of the television screen and between the bottom and middle horizontal regions of the television screen. Most viewers will complain about this phenomenon, which may require a service call to replace the CRT or CRT's. If the television is a projection television (PTV), which typically includes three color CRT's, this service call may cost $500 or more.

One method used to reduce this non-uniform CRT phosphor aging problem involves slowly moving the electron scanning angle over time, so that the spatial transition lines are blurred. Another method involves pre-aging the CRT phosphor with white video, which takes advantage of the fact that the problem of non-uniform CRT illumination lessens with time. These methods, however, only reduce the problem of non-uniform CRT illumination, and do not necessarily eliminate the problem. Still another method involves illuminating the respective top and bottom portions of the CRT with gray video when an HDTV video signal is displayed. This method, however, reduces the amount of resolution that is available for display of the actual HDTV video signal. For example, if the entire area of the CRT is provided with a resolution of 1080 interlaced lines, only 810 interlaced lines will be provided for display of the HDTV video signal.

Accordingly, an improved method and apparatus for uniformly aging the phosphor material on a CRT is desired.

SUMMARY OF THE INVENTION

Methods and apparatus are utilized for uniformly aging the phosphor material on a CRT. The CRT may be located in a display device, such as a television, a computer monitor, or any other device that uses a CRT to transform a video signal into light output. The method serves to uniformly age a CRT that has been previously illuminated at a mismatched illumination ratio. This mismatched illumination ratio occurs when the CRT is illuminated in response to a video signal formatted in an aspect ratio different from the aspect ratio of the display screen. By way of non-limiting example, if the display screen has an aspect ratio of 4:3, illumination of the CRT in response to a video signal formatted in a 16:9 aspect ratio, such as an HDTV video signal, will cause a mismatched illumination. In this scenario, a primary region of the CRT corresponding to the middle horizontal region of the television screen is illuminated, and a secondary region of the CRT corresponding to the respective top and bottom horizontal regions of the television screen is non-illuminated.

To facilitate the uniform aging of the CRT, one or more CRT aging indicators, which indicates the extent to which the CRT has been illuminated at the mismatched illumination aspect ratio are obtained. These one or more CRT aging indicators may include, for example, an unequalized CRT burn time, i.e., an amount of time the CRT was illuminated at the mismatched illumination aspect ratio, or a combination of an unequalized CRT burn time and an average CRT luminous intensity level exhibited by the CRT when illuminated at the mismatched illumination aspect ratio. The one or more CRT aging indicators may include a pair of luminous intensity levels measured at the respective primary and secondary CRT regions in response to an internal video signal, preferably a uniform white video signal.

The secondary CRT region is illuminated based upon the one or more CRT aging indicators. In the preferred method, this is accomplished by generating an internal video signal, during a television off-state, which effects illumination of the secondary CRT region at a greater intensity than that of the primary CRT region. This can be accomplished by illuminating the secondary CRT region without illuminating the primary CRT region. In the preferred method, a desired CRT age equalizing time, i.e., the amount of time the secondary CRT region should be illuminated to equalize the CRT aging, is calculated based on the one or more CRT aging indicators. Precalculation of the desired CRT age equalizing time can be accomplished by aging like CRT's, given known sets of CRT aging indicators, and storing the desired CRT aging equalizing time and corresponding sets of CRT aging indicators within a look-up table. Thus, the secondary CRT region can be illuminated an amount of time equal to the desired CRT age equalizing time to effect equalization of the CRT aging.

Because, in the preferred method, the secondary CRT region is only illuminated during a television off-state, this aging process may be interrupted when the television is placed in the on-state. Thus, in the preferred method, a net cumulated CRT age equalization time is stored, wherein the calculated desired CRT age equalization time can be added thereto and an actual CRT age equalization time can be subtracted therefrom. Thus, the net cumulative CRT age equalization time represents the amount of time the CRT secondary region should be illuminated to equalize the CRT aging at the time the television is placed in the off-state from the on-state, or in the on-state from the off-state. When the net cumulative CRT age equalization time is utilized, the secondary region of the CRT will be illuminated at a luminous intensity level (preferably at a higher intensity level than that at which the CRT is illuminated during normal operation, to minimize the time necessary to uniformly age the CRT) for a period of time equal to the lesser of the net cumulative CRT age equalization time and the television turn-off time. In the preferred method, various means, such as, CRT covers, exterior doors, and interior doors, can be employed to prevent the internally generated video signal from being displayed on the television screen.

In an apparatus, a CRT, video signal terminal, video pattern generator and control circuitry, such as a microcomputer, are provided. In the preferred embodiment, the television screen has a standard 4:3 aspect ratio. The video signal input receives an external video signal and is coupled to the CRT for illuminating the CRT in response to the external video signal. The external video signal is such that the secondary CRT region is not illuminated, such as if the external video signal is non-standard and the CRT is standard. Of course, if the television screen has a non-standard aspect ratio, such as 16:9, a secondary CRT region may not be illuminated if the external video signal is standard. The video pattern generator generates the internal video signal and is coupled to the CRT for illuminating the secondary CRT region. The control circuitry is configured for calculating the desired CRT age equalization time and is coupled to the video pattern generator for generation of the internal video signal for an amount of time equal to the CRT age equalization time. In the preferred embodiment, the control circuitry directs the video pattern generator to generate the internal video signal when the television is in the off-state and directs the video pattern generator to cease generating the internal video signal when the television is in the on-state.

A first timer can be coupled to the control circuitry, such that it can be activated when the external video signal is received and deactivated when the external video signal is not received. In this manner, the unequalized CRT burn time can be tracked. A sensor can also be coupled to the control circuitry for tracking the average CRT luminous intensity level. The control circuitry can utilize these CRT aging indicators to calculate the desired CRT age equalization time.

To prevent viewing of the internal video signal, which may otherwise be annoying to the viewer, display of the internal video signal is blocked by use of means, such as CRT covers, external screen doors or internal screen doors. These blocking means may be automatically controlled upon generation of the internal video signal, or may be manually or remotely performed by the user upon detection of internal video signal display on the television screen. Preferably, the blocking means blocks the entire CRT or television screen to prevent any leakage of light, which may otherwise be visible to the user.

DETAILED DESCRIPTION OF THE INVENTION

Figure 1:
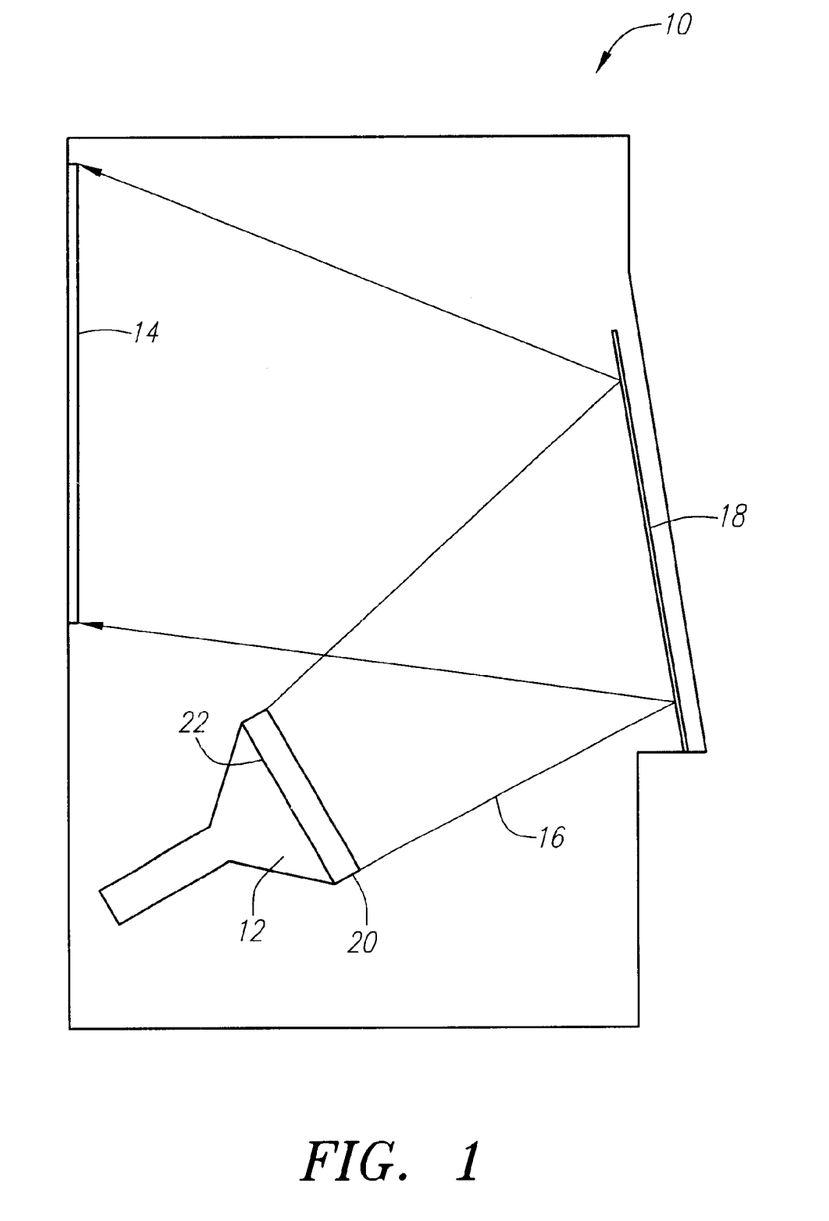
FIG. 1 shows a schematic plan view of a projection television system employing a cathode ray tube (CRT)

Referring to FIG. 1, a preferred embodiment of the present invention is employed to ensure uniform aging of the phosphor surface on each of one or more television cathode ray tubes (CRT's). In FIG. 1, a television 10, and particularly a projection television, comprises a CRT 12 for display of a video image on a projection television screen 14. It should be noted that more than one CRT can be provided to a television. For example, projection televisions typically include three CRT's arranged in a cross-wise fashion. Each of these three CRT's generates one of a distinct primary color image (red, green or blue), which are then combined on the television screen as a composite color image. For purposes of simplicity, however, only one CRT is described in this embodiment.

The CRT 12 serves to transform a video signal into light output 16, which is conveyed to and reflected off of a mirror 18 to the television screen 14 for viewing by the user. In the illustrated embodiment, the television screen 14 has a standard 4:3 aspect ratio. The CRT 12 includes a CRT screen 20. The CRT 12 further includes a phosphor layer 22 disposed on the back side of the CRT screen 20. The phosphor layer 22 is the active light output component, and emits the light output 16 in response to an electron beam incident thereon. As is standard practice, the electron beam scans back and forth in a raster format providing several hundred lines of resolution to the television screen 14.

Figure 2:
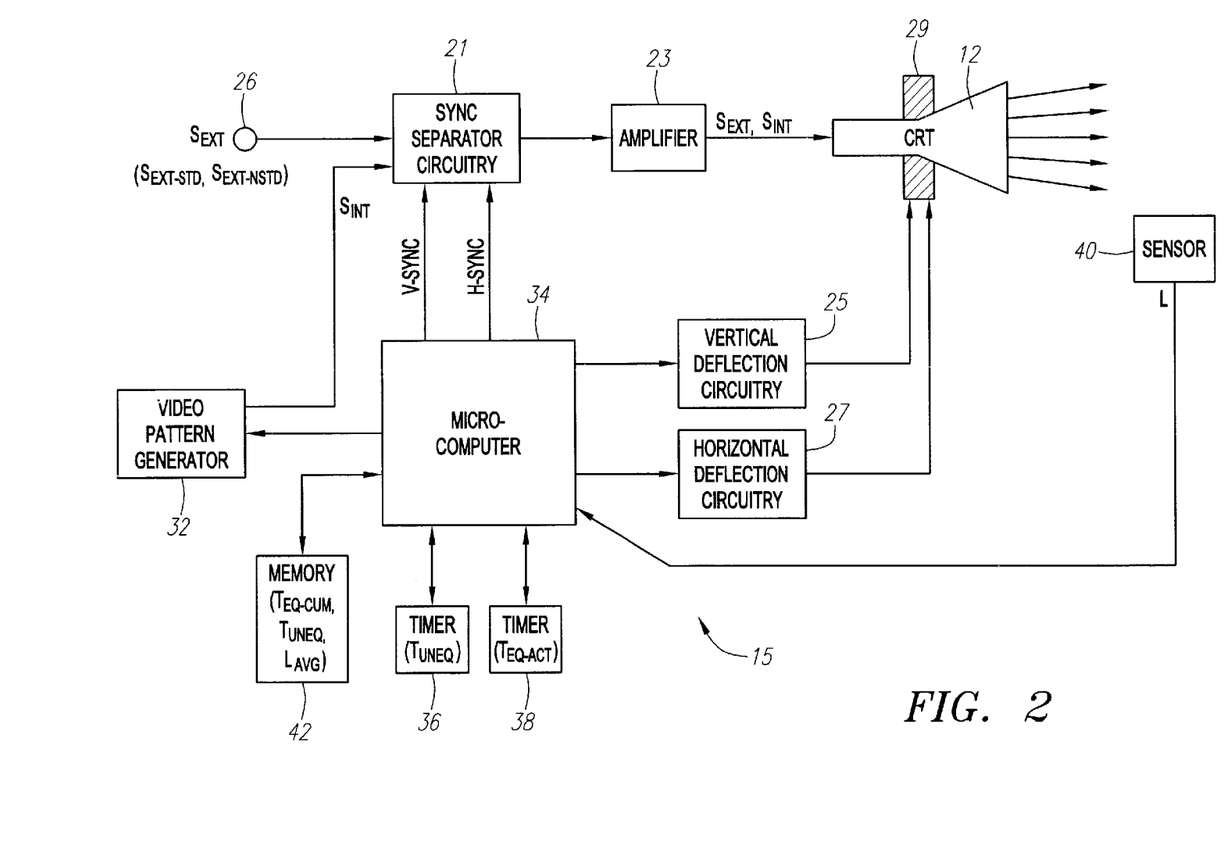
FIG. 2 is a representative block diagram of the components employed to equalize the aging of the CRT depicted in FIG. 1.

Referring to FIG. 2, the television 10 includes CRT age equalization circuitry 15, which advantageously ensures that the CRT 12 is uniformly aged. The equalization circuitry 15 includes a video input terminal 26, which serves to receive an external video signal $S_{EXT}$. The external video signal $S_{EXT}$ may originate from any source, such as a television station, cable system or satellite. Additional sources include a VCR and digital video disk (DVD). Typically, the external video signal $S_{EXT}$ is processed (e.g., by tuning, amplifying or modulated) using standard circuitry known in the art prior to delivery to the video input terminal 26.

The external video signal $S_{EXT}$ contains program material for viewing by the user and can include video material formatted with one of various aspect ratios. For example, the video material may be formatted with a standard aspect ratio (i.e., a 4:3 aspect ratio) or a non-standard aspect ratio, such as e.g., High Definition Television (HDTV) video material formatted with a 16:9 aspect ratio. For the purposes of this specification, an external video signal $S_{EXT}$ containing program material formatted with a standard aspect ratio will be referred to as a standard external video signal $S_{EXT-STD}$, and an external video signal $S_{EXT}$ containing program material formatted with a non-standard aspect ratio will be referred to as a non-standard external video signal $S_{EXT-NSTD}$ The equalization circuitry 15 includes sync separation circuitry 21, which separates the respective horizontal and vertical synchronizing signals V-SYNC and H-SYNC from the external video signal $S_{EXT}$. The equalization circuitry 15 includes an amplifier 23 for amplifying the external video signal $S_{EXT}$ prior to conveyance to the CRT 12, where it is transformed into the scanned electron beam. The V-SYNC and H-SYNC signals are provided to control circuitry 34. In the illustrated embodiment, the control circuitry 34 is a microcomputer. The control circuitry 34, however, could be implemented using a microprocessor, microcontroller, logic, or any other circuitry that can be used to control input and output of memory. The microcomputer 34 can determine the aspect ratio in which the external video signal $S_{EXT}$ is formatted by comparing, for each video field, the active video versus total video for a horizontal line and/or number of horizontal lines in which active video is contained versus the total number of horizontal lines. Alternatively, the signal aspect ratio can be determined by detecting a signal aspect ratio indicator encoded within the external video signal $S_{EXT}$. The microcomputer 34 produces screen control signals in response to the V-SYNC and H-SYNC signals and detected signal aspect ratio. The screen control signals are conveyed to vertical deflection circuitry 25 and horizontal deflection circuitry 27 for output to a deflection yoke 29 located on the CRT 12. The screen control signals may also contain information to control the deflection gains of the respective vertical and deflection circuitry 25 and 27 based on the signal aspect ratio. In this manner, the CRT 12 is scanned with the electron beam as dictated by the V-SYNC and H-SYNC signals and the particular aspect ratio in which the external video signal $S_{EXT}$ is formatted.

Optimally, the entire nominal scan area of the CRT 12 (i.e., the nominal CRT scan area, the illumination of which illuminates the entire television screen) is illuminated in response to the scanned electron beam. This occurs when the external video signal $S_{EXT}$ from which the scanned electron beam originates is a standard external video signal $S_{EXT-STD}$, resulting in a matched illumination aspect ratio, i.e., the video material contained in the standard external video signal $S_{EXT-STD}$ is formatted in a standard 4:3 aspect ratio matching the standard 4:3 aspect ratio of the television screen 14 (shown in FIG. 1). There are instances, however, when only a portion of the nominal CRT scan area is illuminated in response to the scanned electron beam. This occurs when an external video signal $S_{EXT}$ is a non-standard external video signal $S_{EXT-NSTD}$, resulting in a mismatched illumination aspect ratio, i.e., the video material contained in the non-standard external video signal $S_{EXT-NSTD}$ is formatted in an aspect ratio other than a standard 4:3 aspect ratio, such as a 16:9 aspect ratio, which does not match the standard 4:3 aspect ratio of the television screen 14. It should be noted that it is entirely possible to reformat a non-standard external video signal $S_{EXT-NSTD}$ by video processing or deflection current manipulation, such that the entire nominal scan area of the CRT 12 is scanned, and thus uniformly illuminated. For the purposes of this specification, however, it is assumed that the non-standard external video signal $S_{EXT-NSTD}$ will not be adjusted in this manner.

Figure 3:
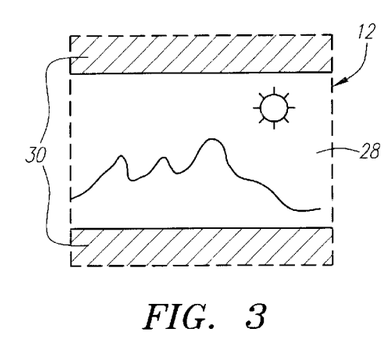
FIG. 3 is a front view of the nominal scan area of a CRT, wherein the CRT is being illuminated in a non-uniform manner, such that a primary CRT region is illuminated and a secondary CRT region is non-illuminated.

In particular, and with reference to FIG. 3, the aspect ratio in which the video material contained in the non-standard external video signal $S_{EXT-NSTD}$ is formatted is greater than the screen aspect ratio, resulting in an illuminated primary CRT region 28 (represented by the middle horizontal region of the CRT 12), and a non-illuminated secondary CRT region 30 (represented by respective top and bottom horizontal regions of the CRT 12). Thus, without correction, the CRT 12 will age in a non-uniform manner over a period of time.

Figure 4:
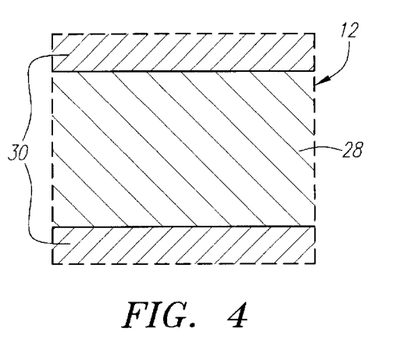
FIG. 4 is a front view of the nominal scan area of the CRT of FIG. 3, wherein the secondary CRT region is illuminated and the primary CRT region is non-illuminated to correct non-uniform aging of the CRT.

Referring to FIGS. 2–4, to correct the non-uniform aging of the CRT 12, the equalization circuitry 15 includes a video pattern generator 32 and control circuitry 34 (in this case, a microcomputer). The video pattern generator 32 is coupled to the CRT 12 and serves to generate an internal video signal $S_{INT}$. The internal video signal $S_{INT}$, much like the external video signal $S_{EXT}$, is processed through synchronization separation circuitry 21 and amplifier 23, and conveyed to the CRT 12, where it is transformed into a scanned electron beam. The internal video signal $S_{INT}$, however, is configured, such that the scanned electron beam originating therefrom illuminates the secondary CRT region 30 with a greater intensity than the primary CRT region 28 is illuminated. Preferably, the intensity at which the secondary CRT region 30 is illuminated is high, and the intensity at which the primary CRT region 28 is illuminated is nil. Thus, it is preferable that the internal video signal $S_{INT}$ is such that the secondary CRT region 30 is scanned in response to white video and the primary CRT region 28 is scanned in response to black video or the primary CRT region 28 is not scanned at all, as depicted in FIG. 4. In this manner, the CRT 12 is evenly aged in an efficient manner over time. In this illustrated embodiment, this CRT aging equalization process is accomplished when the television 10 (shown in FIG. 1) is placed in an off-state, so that all of the scanning resources can be dedicated to the display of the external video signal $S_{EXT}$ when the television 10 is placed in an off-state.

The control circuitry 34, which in the illustrated embodiment takes the form of a microcomputer, ensures that the CRT 12 is uniformly aged by calculating a desired CRT age equalizing time $T_{EQ\text{-}DES}$ (shown in FIG. 5), i.e., the amount of time the secondary CRT region 30 of the CRT 12 should be illuminated to equalize the aging of the CRT 12. The microcomputer 34 then directs the video pattern generator 32, when the television 10 is in an off-state, to generate the internal video signal $S_{INT}$, and particularly a white video signal. Generation of the internal video signal $S_{INT}$ ultimately effects illumination of the secondary CRT region 30 and the beneficial aging of the CRT 12 disposed thereon.

To facilitate calculation of the desired CRT age equalizing time $T_{EQ\text{-}DES}$, the microcomputer 34 is programmed to obtain one or more CRT aging indicators, which indicate the extent to which the CRT has been illuminated at the mismatched illumination aspect ratio, i.e., the extent to which the CRT 12 has been partially illuminated. In the illustrated embodiment, the microcomputer 34 obtains an unequalized CRT burn time $T_{UNEQ}$, i.e., an amount of time the CRT 12 is illuminated at the mismatched illumination aspect ratio. The microprocessor 34 can determine when the CRT 12 is illuminated at the mismatched illumination aspect ratio by detecting the format of the external video signal $S_{EXT}$.

The time-keeping functions are accomplished through use of first and second timers 36 and 38, which may be located internally or externally to the microcomputer 34. The first timer 36 keeps track of the unequalized CRT burn time $T_{UNEQ}$. In this connection, the microcomputer 34 is coupled to the first timer 36 for activating the first timer 36 when a non-standard formatted external video signal $S_{EXT\text{-}NSTD}$ is received by the video signal terminal 26, and deactivating the first timer 36 when a non-standard external video signal $S_{EXTNSTD}$ is not received by the video signal terminal 26 (i.e., if either a standard external video signal $S_{EXT\text{-}STD}$ or no external video signal $S_{EXT}$ is received by the video signal terminal 26). In this manner, the first timer 36 tracks the amount of time that receipt of the non-standard external video signal $S_{EXT\text{-}NSTD}$ causes unequal aging of the CRT 12. Thus, the unequalized CRT burn time $T_{UNEQ}$ dictates, at least in part, the amount of time the secondary CRT region 30 should be illuminated. In general, the greater the unequalized CRT burn time $T_{UNEQ}$, the greater the required desired CRT age equalizing time $T_{EQ\text{-}DES}$.

The second timer 38 keeps track of actual CRT age equalizing time $T_{EQ\text{-}ACT}$, i.e., the amount of time the actual CRT 12 is illuminated during generation of the internal video signal $S_{INT}$. Tracking of the actual CRT age equalizing time $T_{EQ\text{-}ACT}$ allows the microcomputer 36 to determine when the aging of the CRT 12 has been equalized.

The microcomputer 34 also obtains an average luminous intensity level $L_{AVG}$ exhibited by the CRT 12 when illuminated in response to the non-standard external video signal $S_{EXT\text{-}NSTD}$. A luminous intensity level of the CRT 12 is sensed via a sensor 40 located in front of the CRT 12. The microcomputer 34 is coupled to the sensor 40, which continuously feeds luminous intensity values L to the microcomputer 34 for accumulation and calculation of the average CRT luminous intensity level $L_{AVG}$. In alternative embodiments, the average CRT luminous intensity level $L_{AVG}$ can be obtained by sensing the current that drives the CRT 12. The average CRT luminous intensity level $L_{AVG}$ dictates, at least in part, the amount of time that the secondary CRT region 30 should be illuminated. In general, the greater the average CRT luminous intensity level $L_{AVG}$, the greater the desired CRT age equalizing time $T_{EQ\text{-}DES}$. In alternative embodiments, the microcomputer 34 does not obtain an average CRT luminous intensity level $L_{AVG}$ from luminous intensity values L sensed by the sensor 40, but merely assumes a fixed average CRT luminous intensity level.

Non-volatile memory 42, which may be located internal or external to the microcomputer 34, is provided for recording the CRT aging indicators, and particularly the unequalized CRT burn time $T_{UNEQ}$ and the average CRT luminous intensity level $L_{AVG}$. In this connection, the microcomputer 34 is coupled to the memory 42 and stores therein the CRT aging indicators. In the illustrated embodiment, the stored CRT aging indicators are updated periodically, such as every second. In this manner, the CRT aging indicators are updated and not lost when the television 10 is turned off.

Figures 5, 6, 7:
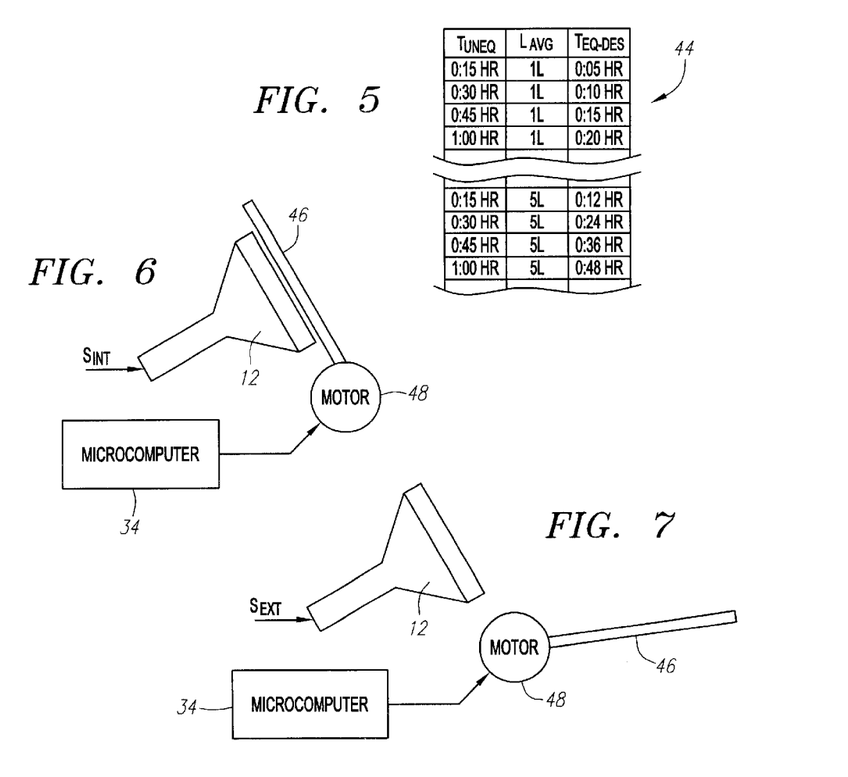
FIG. 5 is an exemplary look-up table utilized by the control circuitry depicted in FIG. 2 to determine an amount of time required to illuminate the secondary CRT region depicted in FIG. 3 to equalize the CRT aging.
FIG. 6 is a schematic plan view showing a CRT cover placed in a closed position over the CRT shown in FIG. 1.
FIG. 7 is a schematic plan view showing the CRT cover of FIG. 5 placed in an open position.

The microcomputer 34 accesses the memory 42 to obtain the CRT aging indicators and calculates the desired CRT age equalizing time $T_{EQ\text{-}DES}$ based thereon. In particular, pre-manufacturing tests can be performed on the CRT 12 or like CRT's to determine the amount of aging that the CRT 12 or like CRT undergoes, given a variety of unequalized CRT burn time $T_{UNEQ}$/average CRT luminous intensity level $L_{AVG}$ combinations. Preferably, the amount of aging can be quantified in terms of the desired CRT age equalizing time $T_{EQ\text{-}DES}$ using white video. Each different unequalized CRT burn time $T_{UNEQ}$/average CRT luminous intensity level $L_{AVG}$ combination and corresponding desired CRT age equalizing time $T_{EQ\text{-}DES}$ can be stored in a look-up table 44 within the memory 42. An example of such a look-up table 44 is depicted in FIG. 5. Thus, given a particular unequalized CRT burn time $T_{UNEQ}$ and CRT average luminous intensity level $L_{AVG}$, the microcomputer 34 can determine the desired CRT age equalizing time $T_{EQ\text{-}DES}$ from the look-up table 44. In the illustrated embodiment, the desired CRT age equalizing time $T_{EQ\text{-}DES}$ is obtained when the television 10 is placed into a turn-off state just prior to generation of the internal video signal $S_{INT}$.

Preferably, the microcomputer 34 maintains a net cumulative CRT age equalizing time $T_{EQ\text{-}CUM}$ stored in the memory 42. The net cumulative desired CRT age equalizing time $T_{EQ\text{-}CUM}$ represents the amount of time required to illuminate the secondary CRT region 30 accumulated over a multitude of television turn-off states due to interruptions in the CRT aging process. In the preferred embodiment, interruptions occur when the television 10 is placed into a turn-on state. As will be described in further detail below, the microcomputer 34, after calculation, adds the desired CRT age equalizing time $T_{EQ\text{-}DES}$ to the net cumulative CRT age equalizing time $T_{EQ\text{-}DES}$, and subtracts the time that the secondary region 30 of the CRT 12 is actually being illuminated from the net cumulative CRT age equalization time $T_{EQ\text{-}CUM}$.

As an alternative to, or in addition to, obtaining the unequalized CRT burn time $T_{UNEQ}$ and the average CRT luminous intensity level $L_{AVG}$, the microcomputer 34 can obtain the luminous intensity levels L at the respective primary and secondary CRT regions 28 and 30 when the CRT 12 is illuminated at a matched illumination aspect ratio, preferably, in response to a uniform internal video signal $S_{INT}$ (for instance, white video). The luminous intensity levels L can be measured by one or more sensors, such as the sensor 40. In this manner, the extent to which the CRT 12 has been unequally illuminated can be determined in a more simplistic manner, obviating the need for time keeping functions, and providing a more accurate indication of the extent to which the CRT 12 has been illuminated at a mismatched aspect ratio.

Figure 9:
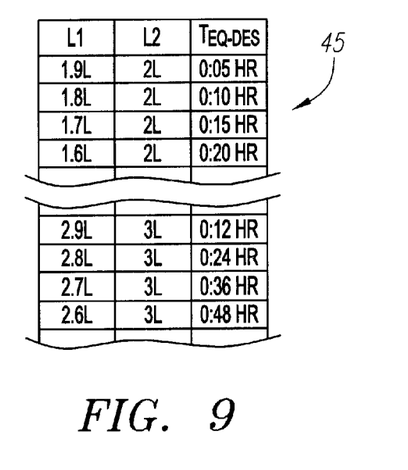
FIG. 9 is another exemplary look-up table utilized by the control circuitry depicted in FIG. 2 to determine an amount of time required to illuminate the secondary CRT region depicted in FIG. 3 to equalize the CRT aging.

The CRT age equalizing time $T_{EQ\text{-}DES}$ can be calculated based on a pair of luminous intensity levels L measured at the respective primary and secondary CRT regions 28 and 30. In particular, pre-manufacturing tests can be performed on the CRT 12 or like CRT's to determine the amount of aging that the CRT 12 or like CRT undergoes, given a variety of luminous intensity level L pairs. Each luminous intensity level L pair and corresponding CRT age equalizing time $T_{EQ\text{-}DES}$ can be stored in the lookup table 45 within the memory 42. An example of such a look-up table 45 is depicted in FIG. 9. The luminous intensity level measured at the primary CRT region 28 is represented by $L_1$, and the luminous intensity level measured at the secondary CRT region 30 is represented by $L_2$. Thus, given a particular luminous intensity level pair ($L_1$, $L_2$), the microcomputer 34 can determine the desired CRT age equalizing time $T_{EQ\text{-}DES}$ from the look-up table 45.

Referring further to FIGS. 6 and 7, a CRT cover 46 is provided to alternately cover and uncover the CRT 12. Upon generation of the internal video signal $S_{INT}$, the CRT cover 46 is moved to a closed position (FIG. 6). In this manner, the internal video signal $S_{INT}$ is not displayed to the user, which would otherwise appear on the television screen 14 as two horizontal white bars, an image that may be irritating to a typical user. Upon receipt of the external video signal $S_{EXT}$, the CRT cover 46 is moved to an open position (FIG. 7). In this connection, the CRT cover 46 is mechanically coupled to a motor 48, which rotates the CRT cover 46 between a closed position covering the CRT 12 and an open position uncovering the CRT 12. Of course other means besides the motor 48 can be used to rotate the CRT cover 46. The microcomputer 34 is electrically coupled to the motor 48, allowing the microcomputer 34 to alternately cover and uncover the CRT 12 on command. In alternative embodiments, television doors can be provided to block the region of the television screen 14 that displays the internal video signal $S_{INT}$. A system that utilizes television doors to block out regions of a television screen is disclosed in copending application Ser. No. 09/450,942 filed Nov. 29, 1999, which has previously been incorporated herein by reference.

Figure 8:
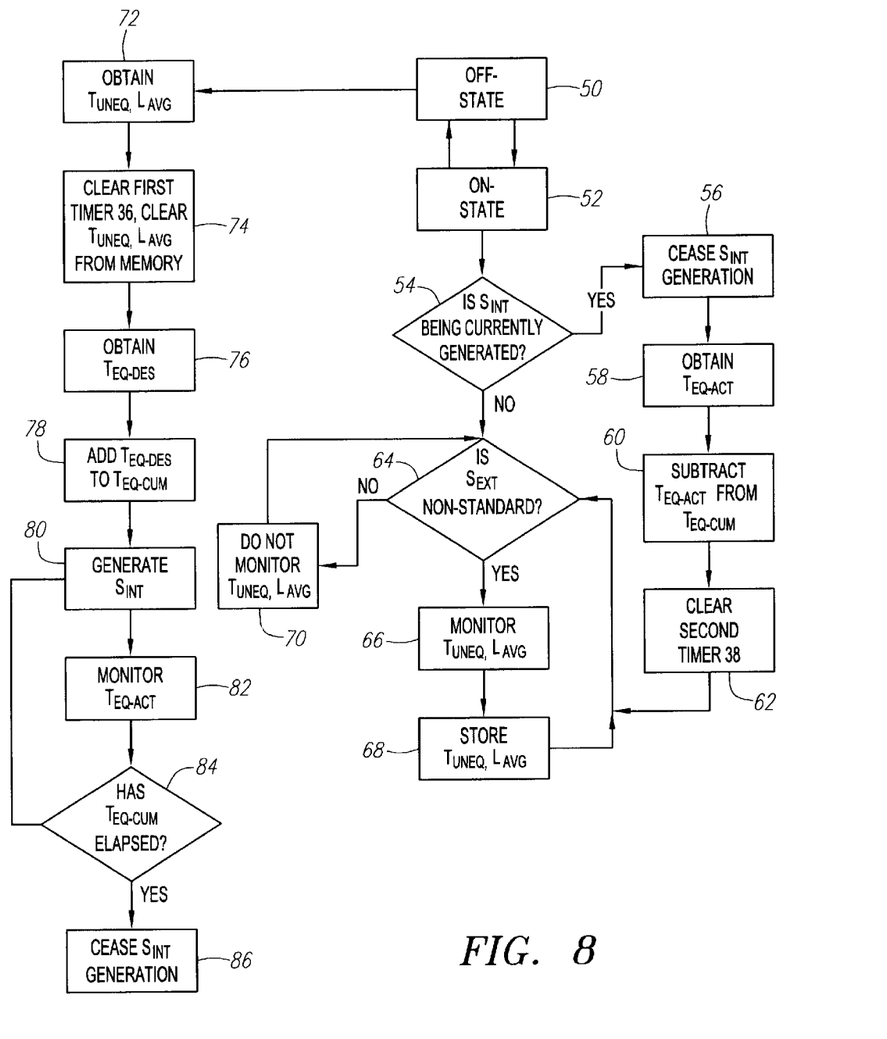
FIG. 8 is a flow diagram depicting a preferred method used by the control circuitry to equalize the aging of the CRT of FIG. 1.

Referring to FIG. 8, a preferred method of operating the television system 10 is described. When the television 10 is in the off-state (block 50), the microcomputer 34 continuously determines whether the television has been placed in the on-state by monitoring a power-on control signal (either transmitted from a remote control to an infrared receiver or transmitted from a function key located on the main unit itself (block 52). If the television 10 has been placed in the on-state, the microcomputer 34 determines if the internal video signal $S_{INT}$ is currently being generated, i.e., whether the secondary CRT region 30 is currently being aged (block 54). If the internal video signal $S_{INT}$ is currently being generated, the microcomputer 34 directs the video pattern generator 32 to cease generating the internal video signal $S_{INT}$ (block 56), allowing the external video signal $S_{EXT}$ to be displayed on the television screen 14.

Because the aging of the secondary CRT region 30 has been interrupted, equalization of the CRT aging has not been completed. The microcomputer 34 relies on the stored net cumulative CRT age equalization time $T_{EQ\text{-}CUM}$ to complete the CRT aging process when the television is again placed in the off-state. In this connection, the microcomputer 34 obtains the actual CRT age equalization time $T_{EQ\text{-}ACT}$ from the second timer 38, which, as discussed above, represents the amount of time the secondary CRT region 30 was aged in the previous television off-state (block 58). The microprocessor 34 subtracts the actual CRT age equalization time $T_{EQ\text{-}ACT}$ from the net cumulative CRT age equalization time $T_{EQ\text{-}CUM}$ (block 60). Thus, the net cumulative CRT age equalization time $T_{EQ\text{-}CUM}$ represents the amount of time (which has been accumulated during one or more television on-states less the time the secondary CRT region 30 has been aged during one or more television off-states) that the secondary CRT region 30 must be aged to effect uniform aging of the CRT 12. The microcomputer 34 then clears the second time 38 (block 62), so that the actual CRT age equalization time $T_{EQ\text{-}ACT}$ during the next television off-state can be determined (block 58).

If the internal video signal $S_{INT}$ is not currently being generated (block 54), or after the second time 38 is cleared (block 62), the microcomputer 34 monitors the CRT aging indicators during each receipt of a non-standard external video signal $S_{EXT\text{-}NSTD}$. In particular, the microcomputer 34 determines if the currently received external video signal $S_{EXT}$ is standard or non-standard (block 64). If the currently received external video signal $S_{EXT}$ is non-standard, the microcomputer 34 activates the first timer 36 to monitor the unequalized CRT burn time $T_{UNEQ}$, and obtains the CRT luminous intensity level L from the sensor 40 to monitor the average CRT luminous intensity level $L_{AVG}$ (block 66). The microcomputer 34 then stores these values in the memory 42 (block 68).

If a non-standard external video signal $S_{EXT\text{-}NSTD}$ is not currently being received (i.e., if a standard external video signal $S_{EXT\text{-}NSTD}$ is being received or no external video signal $S_{EXT}$ is being received), the microcomputer 34 deactivates the first timer 36, i.e., the unequalized CRT burn time $T_{UNEQ}$ is not monitored, since the CRT 12 is presumably being equally aged in the absence of a non-standard external video signal $S_{EXT\text{-}NSTD}$ (block 70). In this manner, the unequalized CRT burn time $T_{UNEQ}$ does not include the time during which the respective CRT primary and secondary regions 28 and 30 are being equally illuminated by a single video signal. Additionally, the CRT luminous intensity level L is not monitored, since, as stated, the CRT 12 is presumably being equally aged. The microcomputer 34 continuously determines whether the external video signal $S_{EXT}$ is standard or non-standard (block 64), SO that the unequalized CRT burn time $T_{UNEQ}$ and average CRT luminous intensity level $L_{AVG}$ is only obtained during the period in which the CRT is being unequally aged in response to channel switching between non-standard external video signals $S_{NE}$ and standard external video signals $S_E$.

When the television 10 is in the on-state (block 52), the microcomputer 34 continuously determines whether the television has been placed in the off-state by monitoring a power-off control signal (either transmitted from a remote control to an infrared receiver or transmitted from a function key located on the main unit itself (block 50). The microcomputer 34 then calculates the desired CRT age equalizing time $T_{EQ\text{-}DES}$. In particular, the microcomputer 34 obtains the values of the CRT aging indicators, i.e., the unequalized CRT burn time $T_{UNEQ}$ and average CRT luminous intensity level $L_{AVG}$, from the memory 42 (block 72). The microcomputer 34 then clears these values from the memory 42 and clears the first timer 36 (block 74). The microcomputer 34 then obtains the desired CRT age equalizing time $T_{EQ}$ from the lookup table 44, i.e., the desired CRT age equalizing time $T_{EQ}$ corresponding to the obtained unequalized CRT burn time $T_{UNEQ}$ and average CRT luminous intensity level $L_{AVG}$ (block 76). Of course, if a non-standard external video signal $S_{EXT\text{-}NSTD}$ was not received during the previous television on-state, the desired CRT age equalizing time $T_{EQ\text{-}DES}$ will be zero.

Next, the desired CRT age equalizing time $T_{EQ\text{-}DES}$ is added to the net cumulative CRT age equalization time $T_{EQ\text{-}CUM}$ (block 78). It should be noted that, if the CRT aging process during the previous television off-state was completed, the net cumulative CRT age equalization time $T_{EQ\text{-}CUM}$ will be zero prior to addition of the desired CRT age equalizing time $T_{EQ\text{-}DES}$ thereto. The microcomputer 34 then directs the video pattern generator 32 to generate the internal video signal $S_{INT}$, so that the secondary CRT region 30 is illuminated, and thus aged (block 80). The microcomputer 34 also activates the second timer 38 to keep track of the time during the current television off-state that the secondary CRT region 30 is illuminated, i.e., the actual CRT age equalizing time $T_{EQ\text{-}ACT}$ is monitored (block 82). In this manner, if the aging process is interrupted, the net cumulative CRT age equalization time $T_{EQ\text{-}CUM}$ can be updated by subtracting the actual CRT age equalizing time $T_{EQ\text{-}ACT}$ from the net cumulative CRT time $T_{EQ\text{-}CUM}$ (block 60). The secondary CRT region 30 is aged until the net cumulative CRT age equalization time $T_{EQ\text{-}CUM}$ has elapsed. The microcomputer 34 determines if the net cumulative CRT age equalization time $T_{EQ\text{-}CUM}$ has elapsed (block 84). If the net cumulative CRT age equalization time $T_{EQ\text{-}CUM}$ has elapsed, the microcomputer 34 directs the video pattern generator 32 to cease generating the internal video signal $S_{INT}$ (block 86). If the net cumulative CRT age equalization time $T_{EQ\text{-}CUM}$ has not elapsed, and absent interruption (by placement of the television 10 in the on-state), the microcomputer 34 directs the video pattern generator 32 to continue generating the internal video signal $S_{INT}$ (block 80). Thus, while in the current television off-state, the secondary CRT region 30 is aged a period of time equal to the lesser of the net cumulative CRT age equalization time $T_{EQ\text{-}CUM}$, and an amount of time the television is in the current off-state.

Figure 10:
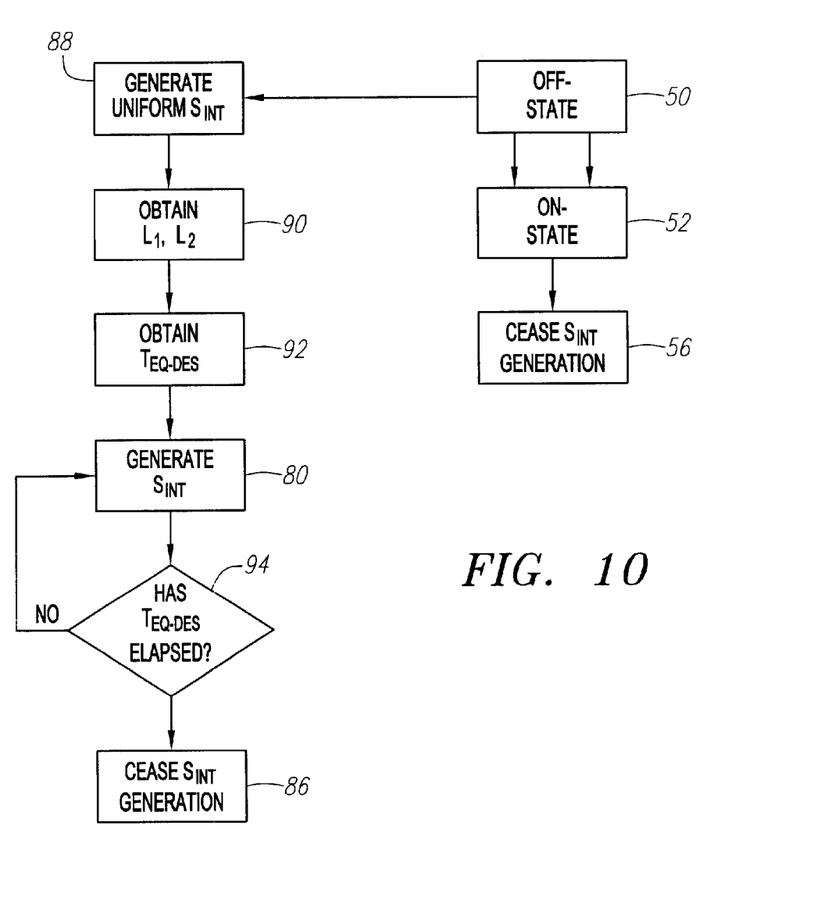
FIG. 10 is a flow diagram depicting an alternative preferred method used by the control circuitry to equalize the aging of the CRT of FIG. 1.

Referring to FIG. 10, an alternative preferred method of operating the television system 10 is described. This method is similar to that described with respect to FIG. 8, with the exception that this method utilizes the pair of luminous intensity levels ($L_1$, $L_2$) measured at the respective primary and secondary CRT regions 28 and 30, rather than the unequalized CRT burn time $T_{UNEQ}$ and average CRT luminous intensity level $L_{AVG}$. To the extent that the steps in this method are similar to those described above, identical reference numbers have been used.

As described above, when the television 10 is in the off-state (block 50), the microcomputer 34 continuously determines whether the television has been placed in the on-state by monitoring a power-on control signal (either transmitted from a remote control to an infrared receiver or transmitted from a function key located on the main unit itself (block 52). If the television 10 has been placed in the on-state, the microcomputer 34 ceases generation of the internal video signal $S_{INT}$ if currently being generated. When the television 10 is in the on-state (block 52), the microcomputer 34 continuously determines whether the television has been placed in the off-state by monitoring a power-off control signal (either transmitted from a remote control to an infrared receiver or transmitted from a function key located on the main unit itself (block 50). The microcomputer 34 then calculates the desired CRT age equalizing time $T_{EQ\text{-}DES}$. That is, a uniform internal video signal $S_{INT}$ is generated (block 88), and the microcomputer 34 obtains the luminous intensity levels $L_1$ and $L_2$ measured at the respective primary and secondary CRT regions 28 and 30 (block 90). The microcomputer 34 then obtains the desired CRT age equalizing time $T_{EQ}$ from the lookup table 45, i.e., the desired CRT age equalizing time $T_{EQ}$ corresponding to the obtained luminous intensity level pair ($L_1$, $L_2$) (block 92).

The microcomputer 34 then directs the video pattern generator 32 to generate the internal video signal $S_{INT}$, so that the secondary CRT region 30 is illuminated, and thus aged (block 80). The secondary CRT region 30 is aged until the CRT age equalizing time $T_{EQ}$. That is, the microcomputer 34 determines if the CRT age equalizing time $T_{EQ}$ has elapsed (block 94), and if elapsed, directs the video pattern generator 32 to cease generating the internal video signal $S_{INT}$ (block 86). If the CRT age equalizing time $T_{EQ}$ has not elapsed, and absent interruption (by placement of the television 10 in the on-state), the microcomputer 34 directs the video pattern generator 32 to continue generating the internal video signal $S_{INT}$ (block 80). Thus, while in the current television off-state, the secondary CRT region 30 is aged a period of time equal to the lesser of the CRT age equalizing time $T_{EQ\text{-}CUM}$, and an amount of time the television is in the current off-state.

As is apparent from a comparison of the respective flow charts in FIGS. 8 and 10, the use of luminous intensity levels $L_1$ and $L_2$, measured at the respective primary and secondary CRT regions 28 and 30 in response to a uniform internal video signal $S_{INT}$, provides a more efficient means of obtaining the CRT age equalizing time $T_{EQ}$, minimizing, if not eliminating, the need for time keeping functions.

Although the foregoing invention has been described in some detail by way of illustration and example for purposes of clarity and understanding, it may be readily apparent to those of ordinary skill in the art, in light of the teachings of this invention, that certain changes and modifications may be made thereto without departing from the spirit or scope of the appended claims.

I claim:

1. A method for uniformly aging a cathode ray tube (CRT) in a display device, the display device having a display screen associated with the CRT, comprising:

illuminating the CRT at a mismatched illumination aspect ratio in response to a video signal, whereby a primary CRT region is illuminated and a secondary CRT region is not illuminated;

measuring a pair of luminous intensity levels exhibited by the primary CRT region and secondary CRT region when illuminated; and illuminating the secondary CRT region based on the measured pair of luminous intensity levels.

2. The method of claim 1, wherein the video signal is formatted in an aspect ratio greater than an aspect ratio of the display screen.

3. The method of claim 1, wherein the secondary CRT region is illuminated until the respective primary and secondary regions of the CRT are aged equally.

4. The method of claim 1, further comprising calculating a desired CRT age equalizing time from the measured pair of luminous intensity levels, wherein the secondary CRT region is illuminated an amount of time equal to the desired CRT age equalizing time.

5. The method of claim 4, wherein the secondary CRT region is illuminated with white video.

6. The method of claim 1, wherein the video signal has an aspect ratio of 16:9, and the display screen has an aspect ratio of 4:3.

7. The method of claim 1, further comprising covering the CRT when the secondary CRT region is illuminated.

8. The method of claim 1, wherein the secondary CRT region corresponds to a top horizontal screen region and a bottom horizontal screen region.

9. The method of claim 1, wherein the measured pair of luminous intensity levels is recorded.

10. The method of claim 1, further comprising illuminating the CRT at a matched illumination aspect ratio, wherein the pair of luminous intensity levels is measured while the CRT is illuminated at the matched illumination aspect ratio.

11. The method of claim 10, further comprising generating another video signal, wherein the CRT is illuminated at the matched illumination aspect ratio in response to the other video signal.

12. The method of claim 10, wherein the other video signal is internally generated.

13. The method of claim 10, wherein the other video signal comprises a white video signal.

14. The method of claim 1, wherein the pair of luminous intensity levels is simultaneously sensed.

15. A display device, comprising:
a cathode ray tube (CRT);
a video signal input coupled to the CRT, the video signal input configured for receiving an external video signal formatted, such that a primary CRT region is illuminated and a secondary CRT region is not illuminated;
a video pattern generator coupled to the CRT, and configured for generating an internal video signal formatted, such that the secondary CRT region is illuminated; and
control circuitry comprising one or more sensors configured for sensing a pair of luminous intensity levels at the CRT primary and secondary regions, respectively, the control circuitry configured for calculating a desired CRT age equalizing time based on the sensed pair of luminous intensity levels, the control circuitry coupled to the video pattern generator for directing the video pattern generator to generate the internal video signal for an amount of time equal to the desired CRT age equalizing time.

16. The display device of claim 15, further comprising a motor and a CRT cover mechanically coupled to the motor, the CRT cover movable between a closed position covering the CRT and an open position uncovering the CRT, the control circuitry electrically coupled to the motor for directing the motor to place the CRT cover in the closed position upon generation of the internal video signal, and in the open position upon receipt of the external video signal.

17. The display device of claim 15, wherein the video pattern generator is configured for generating a white video signal.

18. The display device of claim 15, further comprising a display screen associated with the CRT, wherein the external video signal is formatted in an aspect ratio greater than an aspect ratio of the display screen.

19. The display device of claim 15, further comprising a display screen associated with the CRT, wherein the external video signal is formatted in a 16:9 aspect ratio and the display screen has 4:3 aspect ratio.

20. The display device of claim 15, wherein the video pattern generator is further configured for generating another internal video signal formatted, such that that both the CRT primary region and CRT secondary region are illuminated, and wherein the one or more sensors is configured for sensing the pair of luminous intensity levels to which the CRT is subjected when the CRT is illuminated in response to the other internal video signal.

21. The display device of claim 20, wherein the other internal video signal comprises a white video signal.

22. The display device of claim 15, wherein the one or more sensors is configured for simultaneously sensing the pair of luminous intensity levels.

23. A display device, comprising:
a cathode ray tube (CRT);
a display screen associated with the CRT, the display screen having a screen aspect ratio;
a video signal input coupled to the CRT, and configured for receiving an external video signal containing video information formatted with a signal aspect ratio different from the screen aspect ratio;
a video pattern generator coupled to the CRT, and configured for generating an internal video signal formatted to illuminate a portion of the CRT not illuminated in response to the external video signal; and
control circuitry comprising one or more sensors configured for sensing a pair of luminous intensity levels at portions of the CRT illuminated in response to the external video signal and not illuminated in response to the external video signal, respectively, the control circuitry configured for calculating a desired CRT age equalizing time based on the sensed pair of luminous intensity levels, the control circuitry further coupled to the video pattern generator for directing the video pattern generator to generate the internal video signal for a period of time equal to the desired CRT age equalizing time.

24. The display device of claim 23, wherein the control circuitry is configured for directing the video pattern generator to generate the internal video signal when the display device is in an off-state and for directing the video pattern generator to cease generating the internal video signal when the display device is in an on-state.

25. The display device of claim 23, further comprising a motor and a CRT cover mechanically coupled to the motor, the CRT cover movable between a closed position covering the CRT and an open position uncovering the CRT, the control circuitry electrically coupled to the motor for directing the motor to place the CRT cover in the closed position upon generation of the internal video signal, and in the open position upon receipt of the external video signal.

26. The display device of claim 23, wherein the video pattern generator is further configured for generating another internal video signal formatted to illuminate portions of the CRT illuminated in response to the external video signal and not illuminated in response to the external video signal, and wherein the one or more sensors is configured for sensing the pair of luminous intensity levels to which the CRT is subjected when the CRT is illuminated in response to the other internal video signal.

27. The display device of claim 26, wherein the other internal video signal comprises a white video signal.

28. The display device of claim 23, wherein the one or more sensors is configured for simultaneously sensing the pair of luminous intensity levels.

29. A method for uniformly aging a cathode ray tube (CRT) within a display device, the display device including a display screen having a screen aspect ratio, the method comprising:

during a display device turn-on time, monitoring one or more CRT aging indicators to which the CRT is subjected during each receipt of a non-standard video signal, the non-standard video signal formatted with a signal aspect ratio greater than the screen aspect ratio, whereby a primary CRT region is illuminated and a secondary CRT region is not illuminated when the non-standard video signal is received;

calculating a desired CRT age equalizing time based on the one or more monitored CRT aging indicators;

adding the desired CRT age equalizing time to a stored net cumulative CRT age equalization time;

during a display device turn-off time, illuminating the secondary CRT region, but not the primary CRT region, a period of time equal to the lesser of the stored net cumulative CRT age equalization time and a display device turn-off time; and subtracting the period of time the secondary CRT region is illuminated from the net cumulative CRT age equalization time.

30. The method of claim 29, wherein the one or more CRT aging indicators includes an unequalized CRT burn time equal to a period of time the secondary CRT region is not illuminated when each non-standard video signal is received.

31. The method of claim 30, wherein the one or more CRT aging indicators further includes an average luminous intensity level exhibited by the CRT while each non-standard video signal is received.

32. The method of claim 29, wherein the secondary CRT region is illuminated using an internally generated white video signal.

33. The method of claim 29, wherein the signal aspect ratio is 16:9 and the screen aspect ratio is 4:3.

34. The method of claim 29, further comprising preventing viewing of the internal video signal by a user.

35. The method of claim 29, further comprising covering the CRT when the secondary CRT region is illuminated.

36. The method of claim 29, wherein the desired CRT age equalizing time is calculated in a look-up table.

37. The method of claim 29, wherein, during the display device turn-of time, an actual CRT age equalization time is subtracted from the stored net cumulative CRT age equalizing time.

38. A method for uniformly aging a cathode ray tube (CRT) in a display device, the method comprising:

receiving an external video signal;

illuminating the CRT at a mismatched illumination aspect ratio in response to the external video signal, whereby a primary CRT region is illuminated and a secondary CRT region is not illuminated;

measuring a pair of luminous intensity levels exhibited by the primary CRT region and secondary CRT region when illuminated; and illuminating the secondary CRT region based on the measured pair of luminous intensity levels.

39. The method of claim 38, wherein the secondary CRT region is illuminated until the CRT is evenly aged.

40. The method of claim 38, wherein the secondary CRT region is illuminated at a greater intensity than the intensity at which the primary CRT region is illuminated.

41. The method of claim 38, wherein the primary CRT region is not illuminated when the secondary CRT region is illuminated.

42. The method of claim 38, wherein the secondary CRT region and primary CRT region are simultaneously illuminated in response to white video and black video, respectively.

43. The method of claim 38, wherein the secondary CRT region is illuminated when the external video signal is not received.

44. The method of claim 38, further comprising illuminating the CRT at a matched illumination aspect ratio, wherein the pair of luminous intensity levels is measured while the CRT is illuminated at the matched illumination aspect ratio.

45. The method of claim 44, further comprising generating another video signal, wherein the CRT is illuminated at the matched illumination aspect ratio in response to the other video signal.

46. The method of claim 44, wherein the other video signal is internally generated.

47. The method of claim 45, wherein the other video signal comprises a white video signal.

48. The method of claim 38, wherein the pair of luminous intensity levels is simultaneously sensed.

* * * * *